United States Patent
Ledjeff et al.

[11] Patent Number: 5,925,477
[45] Date of Patent: Jul. 20, 1999

[54] ASSEMBLY OF SINGLE CELLS TO FORM A DIAPHRAGM ELECTRODE UNIT

[75] Inventors: Konstantin Ledjeff, Bad Krozingen; Roland Nolte, Denzlingen, both of Germany

[73] Assignee: Fraunhofer-Gesellschaft zur Forderung der Angewandten Forschung e.V., Germany

[21] Appl. No.: 08/930,370

[22] PCT Filed: Jan. 23, 1996

[86] PCT No.: PCT/DE96/00111

§ 371 Date: Sep. 24, 1997

§ 102(e) Date: Sep. 24, 1997

[87] PCT Pub. No.: WO96/23323

PCT Pub. Date: Aug. 1, 1996

[30] Foreign Application Priority Data

Jan. 26, 1995 [DE] Germany .......................... 195 02 391

[51] Int. Cl.[6] ................................................... H01M 8/10
[52] U.S. Cl. ............................ 429/32; 429/30; 429/34; 429/38; 429/39; 429/18; 429/40; 429/41
[58] Field of Search .................. 429/30, 32, 34, 429/38, 39, 18, 40, 41

[56] References Cited

U.S. PATENT DOCUMENTS

| | | | |
|---|---|---|---|
| 4,833,045 | 5/1989 | Pollack et al. | 429/30 |
| 5,169,731 | 12/1992 | Yoshimura et al. | 429/30 |
| 5,171,646 | 12/1992 | Rohr | 429/30 |
| 5,258,240 | 11/1993 | Di Croce et al. | 429/32 |
| 5,470,671 | 11/1995 | Fletcher et al. | 429/30 |
| 5,686,197 | 11/1997 | Nishida et al. | 429/30 |
| 5,824,428 | 10/1998 | Nishida et al. | 429/30 |

*Primary Examiner*—Bruce F. Bell
*Attorney, Agent, or Firm*—Barnes & Thornburg

[57] ABSTRACT

The invention relates to an assembly of flat single cells consisting of a solid polymer electrolyte and electrode areas applied to both sides thereof into a diaphragm electrode unit in which 2 to 10,000 single cells are connected in series through the stepwise overlapping of the electrode areas (4, 5, 6) of one single cell with the opposite electrode area (7, 8, 9) of the next cell, thus forming a one-dimensional diaphragm electrode unit (1), and a shunt conductive structure of electronically conductive material is placed at least between the overlapping electrode areas.

22 Claims, 5 Drawing Sheets

ASSEMBLY OF SINGLE CELLS TO FORM A DIAPHRAGM ELECTRODE UNIT

CROSS-REFERENCES TO RELATED APPLICATIONS

This application is a U.S. national application of international application serial No. PCT/DE96/00111 filed Jan. 23, 1996, which claims priority to German Serial No. 195 02 391.9 filed Jan. 26, 1995.

The invention relates to an assembly of single cells to form a diaphragm electrode unit, with which the single cells, by stepwise superposition of the electrode areas, are series-connected and to the use of same in a polymer electrolyte diaphragm fuel cell.

Electrochemical cells, e.g. with solid polymeric electrolytes (PEM), comprise, to put it simply, two electrodes on which the electrochemical reactions proceed as well as an electrolyte situated therebetween, carrying out the task of transporting the ions between the electrodes, and being made of an ion-conductive polymer.

When electrochemical reactions voluntarily proceed on both electrodes (oxidation on the anode, reduction on the cathode), the electrochemical cell will deliver a voltage. A single cell will deliver but a relatively low voltage within the range of some millivolts up to some volts. For many practical applications, such as e.g. application of battery fuel cells within traction range, substantially higher voltages are, however, needed.

That is why, up to now, a plurality of such cells have been separately assembled, arranged the one behind the other, and electrically connected in series with one another so that the voltages of the single cells will be added (bipolar stack-type construction). This way of bringing about a series connection certainly enables a realisation of higher voltages; nevertheless, it gives rise to considerable drawbacks. For instance, the constructional efforts of such a series connection are very great since, for one hydrogen/oxygen fuel cell stack, a bipolar plate, a hydrogen gas distributing ring, an ion exchange diaphragm coated with a catalyser, an oxygen gas distributing ring, sealing rings for sealing those components as well as the current distributing structures are generally needed for each single cell. This is a total of 10 components for each single cell. Now if, e.g., a stack output voltage of 70 V is to be realised, then, in case of a single cell voltage of 0.7 V, 100 single cells are required after all, i.e. 1,000 components must be assembled, in which case 400 sealing rings must be fixed.

Another drawback due to series connection is that, in case of failure of only one single cell in the fuel cell stack, the entire stack will break down. A redundant type of construction for the above example, i.e. a parallel connection of several stacks of 70 V, would, however, render the constructional efforts absolutely intolerable. Therefore, the decisive factor for an efficient operation of a PEM fuel cell accordingly is the structure of the diaphragm electrode unit.

Departing from these facts, it, thus, is the object of the present invention to specify a diaphragm electrode unit which is primarily suited for use in PEM fuel cells and which shall possess a high output voltage as well as a simple and low-cost structure.

SUMMARY OF THE INVENTION

In accordance with the invention, it, thus, is suggested to assemble a diaphragm electrode unit such that an assembly of several single cells will be provided, assembly being effected in such a manner that the electrode areas will overlap stepwise and shunt conductive structures being incorporated in the region of overlap.

The diaphragm electrode unit according to the invention comprises ionically conductive diaphragm districts that are bonded with electrode material on both sides. In case of a hydrogen/oxygen fuel cell, each diaphragm district will then be bonded with a hydrogen electrode on the one side and with an oxygen electrode on the opposed side. This being so, all hydrogen electrodes are situated on one side of the diaphragm and all oxygen electrodes on the other side of the diaphragm. Together with the bonded two electrodes, each diaphragm district constitutes a fuel cell unit and, thus, delivers an output voltage. Now, the characteristic feature for the diaphragm electrode unit according to the invention is that each single cell within the diaphragm is series-connected. In accordance with the invention, this is brought about by realising, with a stepwise overlap of the electrode area of one single cell, a series connection with the opposed electrode area of the next single cell. Thus, all the output voltages of each single cell are added up. In this way, the sum of the voltages of all fuel cell units, e.g. on the first electrode of the upper side of the diaphragm and on the last electrode of the lower side of the diaphragm, can be obtained. In case of the stepwise design according to the invention and belonging to the diaphragm electrode unit, it is important that a very good shunt conductivity of the individual external electrode areas be achieved since all of the cell current must flow through the cross-section of this coating. However, it is known that electrodes, according to their form of construction, e.g. when the electrode is made of a pressed-on catalysing powder, show a poor shunt conductivity of up to several 100 ohms. In order to avoid the high cell voltage losses resulting thereby, the diaphragm electrode unit according to the invention has so-called shunt conductive structures that are located in the overlapping electrode areas. The resistance generated by the poor shunt conductivity of the electrode coating and existing between two adjacent but opposed electrodes will, thus, be discernibly reduced. This being so, a diaphragm electrode unit is made available for the first time, which possesses not only a high output voltage and a simple and low-cost structure but which also causes almost no internal cell voltage losses.

In order to ensure ion conductivity, the single cell, therewith, is made of an ion conductive material. For this purpose, solid polymeric electrolytes in the form of diaphragms are used. Since it is either cations or anions that must be transported, the diaphragm must be permeable either to cations or to anions. In an aqueous environment for cation conductive polymers, ion conductivity is, therewith, generally given when the polymer includes firmly anchored carboxylic acid groups and/or sulphonic acid groups and/or phosphonic acid groups, all of which, so to say, are, in general, anchored by a chemical bond. For anion conductive polymers, ion conductivity is given in particular when the polymer contains amino groups, quaternary ammonium groups, or pyridinium groups. The characteristic of ion conductivity is, in case of the hitherto described possibilities, brought about by ions which exist and are firmly anchored in the diaphragm or which are produced in water upon swelling.

Examples of cation conductive polymers of that kind are sulphonated polysulphones, polyether sulphones, or polyether ketones.

The thickness of the diaphragm may, therewith, be within the range of from 0.1 $\mu$m to 5 mm and may, preferably, be within the range of from 10 $\mu$m to 200 $\mu$m. The surfaces of the diaphragm for the single cell are, therewith, designed in dependency on the demanded performance of the stack. The surfaces may be within the range of from 100 $\mu m^2$ to 1,000,000 $mm^2$ and may, preferably, be within the range of from 100 to 10,000 $mm^2$.

In order to enable functioning as a single cell, the above-described diaphragms now are coated with electrode material on both sides. Since the electrochemical reactions of the cell are effected on the electrodes, the electrodes may either be properly made of that material which is electrochemically reacted or they may be made of material which catalyses the electrochemical reaction. The material must be electronically conductive and comprises in particular metals, metal oxides, mixed oxides, alloys, carbon, electronically conductive polymers, or mixtures thereof.

The materials may contain additives serving for standardisation of hydrophily and hydrophoby. With the aid of said additives, the electrode layers may be equipped e.g. with water-repellent properties. The materials may, furthermore, contain additives which permit standardisation of a certain porosity. This is of significance especially when gaseous agents are catalytically reacted on the electrodes, a three-phase contact between gas, catalyser, and ion conductive district being required. Furthermore, so-called bonding agents may be admixed, making a stable and operative connection of the electrode to the ion conductive district easier.

The shunt conductive structures must be made of materials which show a very good electronic conductivity. Metals, alloys, conductive carbons, conductive polymers, or polymers mixed with conductive substances are typically used for this purpose. Thin structures of a thickness of from 10 $\mu m$ to 500 $\mu m$ are preferably made use of since they can be well integrated into the surface structure of the diaphragm electrode unit according to the invention. Furthermore, the shunt conductive structures shall, during cell service life, be stable towards the used fuels (e.g. water/oxygen in a $H_2/O_2$ fuel cell) and shall not, with the occurring cell potentials, be electrochemically attacked. Apart from a good conductivity, it is desired that the shunt conductive structures can be permanently anchored in the strip diaphragm. That is why use is preferably made of such structures that, with regard to their quality, do not show a smooth surface and, upon pasting or fusing, can be firmly anchored with the diaphragm polymers. Such structures may be e.g. nets, tissues, porous structures, or foils with a roughened surface. Such a roughened surface can be brought about e.g. by means of chemical processes or by plasma etching processes.

Now the shunt conductive structures may be so designed that they are guided up on to the external electrode areas. The shunt conductive structures may, therewith, cover the electrode areas almost completely or only partially.

According to a preferred form of construction, it is furthermore suggested, and that for the case that the shunt conductive structure covers the external electrode areas only partially, to additionally arrange fuel-permeable, electronically conductive distributing structures. Those conductive distributing structures may be arranged either directly on the electrode area or above the electrode area and the shunt conductive structure. The task of said distributing structures is to connect the shunt conductive structure to the entire electrode surface without significant electric losses and to simultaneously enable a fuel supply to the electrode surface. Accordingly, the distributing structures must likewise be made of an electronically conductive material. As examples thereof, metal nets or sintered metal compacts are mentioned here.

The shunt conductive structures may also completely cover the electrode areas. In this case, the shunt conductive structure, however, must, in the region of the active electrode areas and in addition to electronic conductivity, also be fuel-permeable then since, otherwise, a supply of the electrodes with fuel would not be possible any more. Also for this inventive form of construction, it is possible and advantageous to use distributing structures yet which will then be arranged again in the arrangement of electrode surface/shunt conductive structure/distributing structure or of electrode surface/distributing structure/shunt conductive structure.

The above-described assembly of flat single cells to form a diaphragm electrode unit will lead to a one-dimensional arrangement.

In accordance with the invention, it now is also possible to assemble several ones of those one-dimensional diaphragm electrode units for forming "two-dimensional" diaphragm electrode units. Two forms of construction are generally feasible herewith. On the one hand, at least 2, and at most 50, one-dimensional diaphragm electrode units can be assembled, the latter being arranged in parallel and connected in parallel or connected in series.

By those forms of construction, a further increase in the output voltage and a redundant current supply, resp, are made possible.

BRIEF DESCRIPTION OF THE DRAWINGS

Other features, details, and merits of the invention result from the following description of the invention on the basis of the Drawing in which.

DETAILED DESCRIPTION OF THE INVENTION

Figure 1:
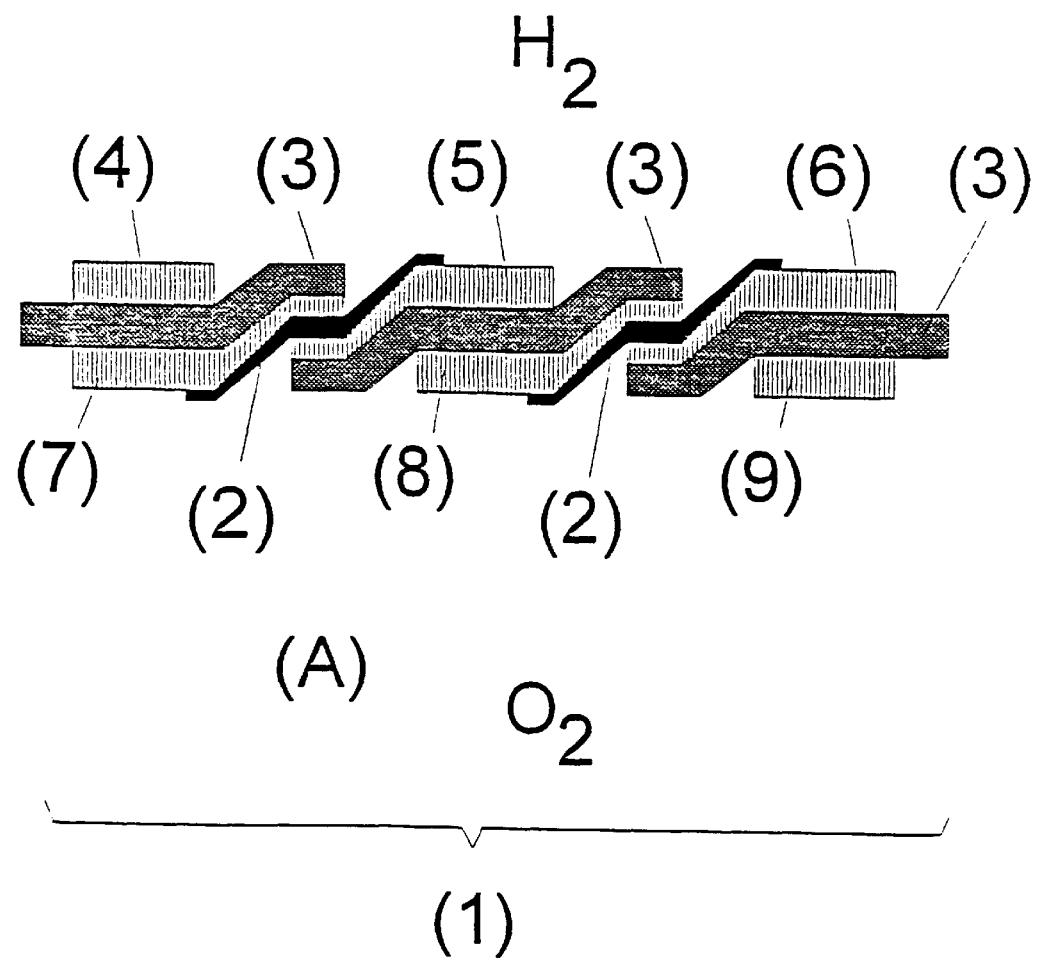
FIG. 1 shows a cross-section of a form of construction in accordance with the invention, having shunt conductive structures guided up on to the outer electrode areas.

According to the form of construction in FIG. 1, the diaphragm electrode unit 1 consists of ionically conductive diaphragm districts 3 which are bonded with electrode material on both sides. In case of a hydrogen/oxygen/fuel cell, each diaphragm district 3 thus is, on the one side, bonded with a hydrogen electrode 4, 5, 6 and, on the opposed diaphragm side, with an oxygen electrode 7, 8, 9. All the hydrogen electrodes 4, 5, 6, therefore, are situated on the one diaphragm side and all the oxygen electrodes 7, 8, 9, thus, are situated on the other diaphragm side. Each diaphragm district, together with the two bonded electrodes, constitutes a fuel cell unit and delivers an output voltage of about 1 volt without load. The inventive essence of the diaphragm electrode unit 1 resides in that its internal single fuel cell units are connected in series. For this purpose, the lower electrode 7, 8 of one fuel cell unit is connected with the upper electrode 5, 6 of the next fuel cell unit through the conductive electrode material at a time, and that in electronically conductive and fuel-impermeable manner. In this way, the sum of the voltages of all fuel cell units on the first electrode 4 and on the last electrode 9 of the lower diaphragm side can be obtained. In order to now achieve a good shunt conductivity of the electrode areas 5, 6 and 7, 8, a shunt conductive structure 2 of good electronic conductivity is incorporated between the overlapping electrode areas. According to the invention, it is sufficient in this case, when the shunt conductive structure 2 covers only the overlapping electrode areas (marked by Symbol A). It is, however, preferred that the shunt conductive structure be passed through from the lower side to the upper side. The shunt conductive structure now passes therewith from one electrode area of one cell unit of the diaphragm electrode unit to the opposed electrode of the next cell unit of the diaphragm electrode unit. In this way, the electrode areas 5, 6 and 7, 8, resp, will, by means of shunt conductive structures 2, be decisively enhanced as to their shunt conductivity. It is important to functioning that a good electronic conductivity of the shunt conductive structure be at hand. This is achieved by making use of correspondingly electronically conductive materials. With the concept according to the invention, it is furthermore essential that, upon guiding of the shunt conductive structures 2 through the diaphragm electrode unit, there be no fuel permeability from the one side of the diaphragm towards the other side.

Such a diaphragm electrode unit is made from polymeric solid electrolyte pieces coated with electrode material, one shunt conductive structure being placed between two solid electrolyte pieces at a time, which structure extends from the lower side of the respectively first solid electrolyte piece towards the upper side of the second solid electrolyte piece. These arrangements, each consisting of solid electrolyte piece/shunt conductive structure/solid electrolyte piece, will subsequently be durably and fuel-tightly connected with one another. Connection of the solid electrolyte pieces with one another and with the shunt conductive structures may be effected e.g. by means of pasting techniques with suitable adhesives.

Figure 2:
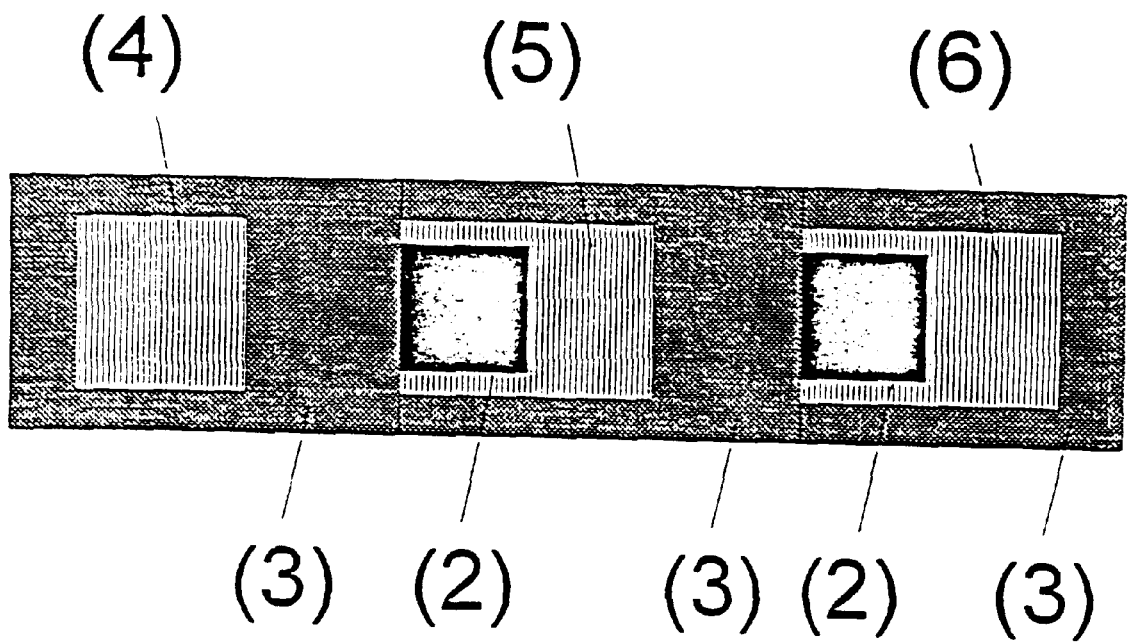
FIG. 2 shows a plan view of the form of construction according to FIG. 1.

FIG. 2 now shows a plan view of the above-described form of construction and makes it clear once again that, in the form of construction according to FIG. 1, the shunt conductive structure 2 overlaps the external electrode areas 5, 6 only partially.

Figure 3:
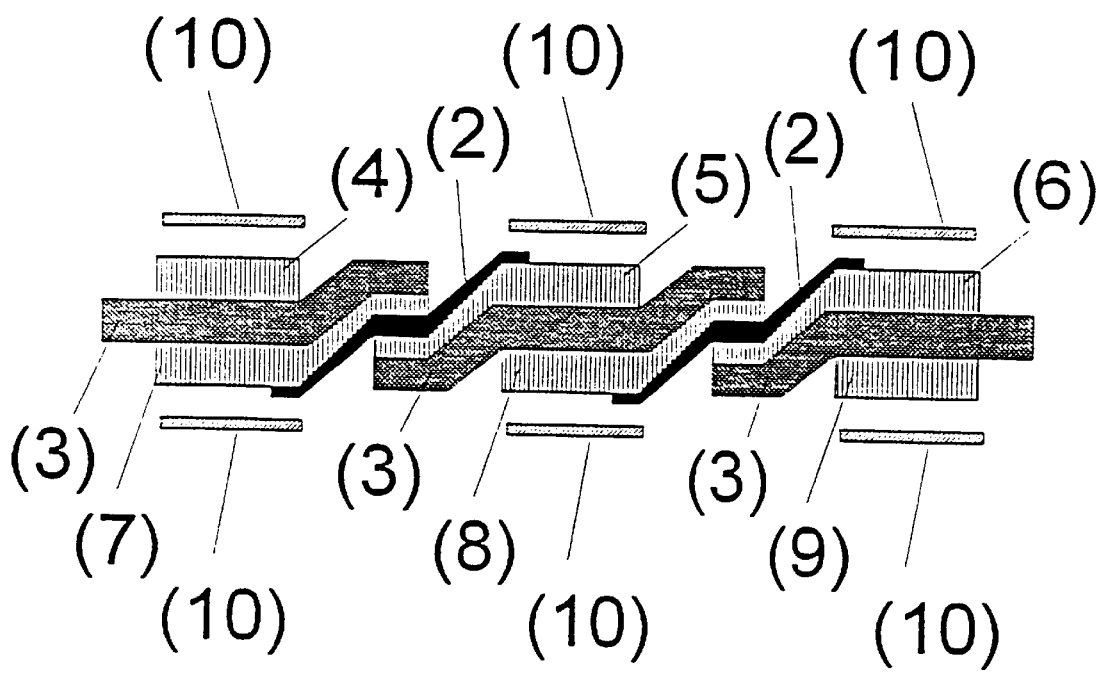
FIG. 3 shows a cross-section of a form of construction, having distributing structures arranged on the shunt conductive structures.

In the form of construction according to FIG. 3, the shunt conductive structure 2 is now directly placed upon the individual electrodes 5, 6 and 7, 8, resp. The shunt conductive structure 2 may, therewith, be made of dense material or of nets, provided that good electrode conductivity is given and that transport of fuels from the one towards the other strip diaphragm side is prevented. In addition to all that, a fuel-permeable, electronically conductive distributing structure 10 is, in the form of construction according to FIG. 3, placed upon the electrode area with the shunt conductive structure 2, making it its task to electrically connect the shunt conductive structure, without significant losses, to the entire electrode area and to enable a fuel supply to the electrode surface at the same time.

Figure 4:
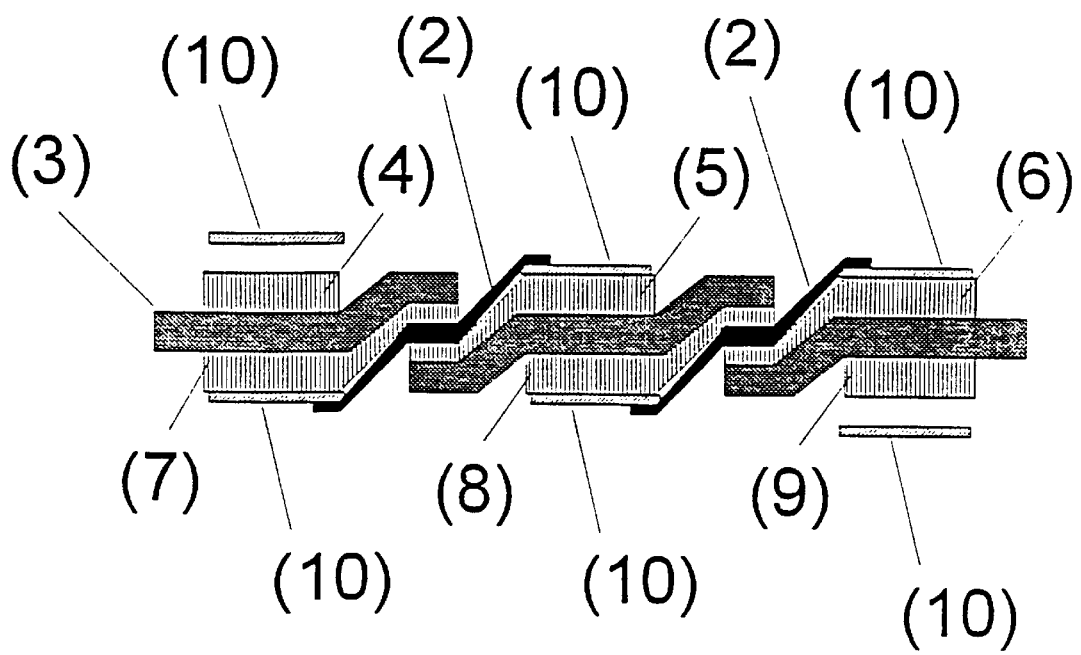
FIG. 4 shows a cross-section of a form of construction, with which the distributing structure is arranged between external electrode areas and the shunt conductive structure.

FIG. 4 now shows another form of construction, and that a variant, with which the fuel-permeable, electronically conductive distributing structure 10 is placed upon the electrode area 4, 5, 6 and 7, 8, 9, resp, and the shunt conductive structure 2 is arranged on the structure 10 only in this case. This arrangement is advantageous in that the electrode surface will be evenly mechanically loaded whereas, with the form of construction according to FIG. 3, the end of the shunt conductive structure 2 will be placed directly upon the electrode area so as to be pressed into the diaphragm when the cell is being assembled. Also with the form of construction according to FIG. 4, the shunt conductive structure 2 may be made e.g. of dense material or of nets, provided that good electron conductivity is given and transport of fuels from the one to the other side is prevented.

Figure 5:
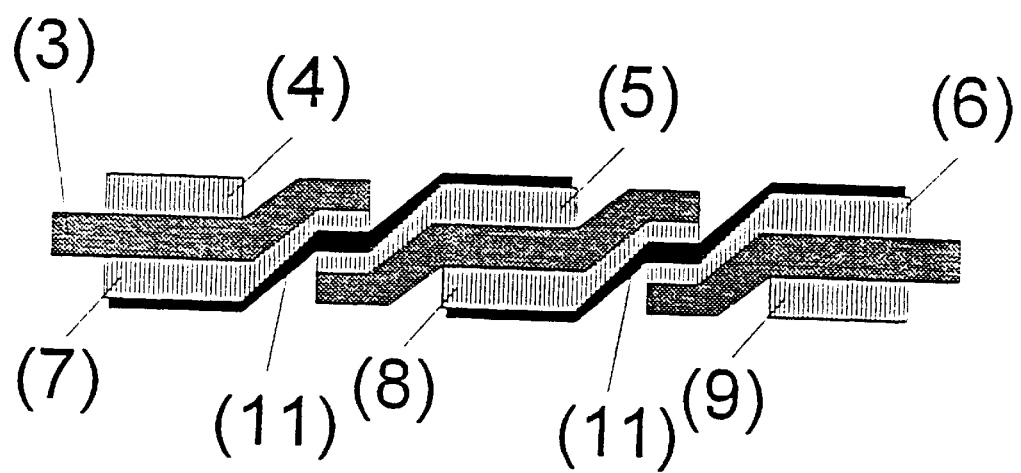
FIG. 5 shows a cross-section of a form of construction, with which the shunt conductive structure completely covers the external electrode areas.

The shunt conductive structures may also completely cover the electrode areas. Such a form of construction is shown in FIG. 5. In this case, the shunt conductive structure 11 must, in addition to being electronically conductive, also be fuel-permeable in the region of the active electrode areas since, otherwise, a supply of the electrodes 5, 6 and 7, 8, resp, with fuel would not be possible any more. But also with that form of construction, additional use of the distributing structures as described above is possible so that here then an arrangement of electrode area/shunt conductive structure/distributing structure or of electrode area/distributing structure/shunt conductive structure will be feasible.

We claim:

1. Assembly of flat single cells, each being made up of a solid polymeric electrolyte and of electrode areas applied to both sides thereof to form a diaphragm electrode unit wherein 2 to 10,000 single cells are, by stepwise overlap of the electrode areas (4, 5, 6) of one single cell, connected in series with the opposed electrode areas (7,8,9) of the next single cell and thus constitute a one-dimensional diaphragm electrode unit (1) and wherein, at least between the electrode areas overlapping one another, a shunt conductive structure (2, 11) made of an electronically conductive material is arranged.

2. Assembly of single cells according to claim 1, wherein the conductive structure (2, 11) is guided up on to the external electrode areas while partially overlapping same.

3. Assembly of single cells according to claim 2 wherein the shunt conductive structure (2, 11) is guided up on to the external electrode area, said shunt conductive structure (2, 11) almost completely covering that electrode area.

4. Assembly of single cells according to claim 2 wherein, on the external electrode areas and the shunt conductive structure, a distributing structure (10) is arranged so as to be at least partially fuel-permeable.

5. Assembly of single cells according to claim 2 wherein, between the external electrode areas and the shunt conductive structure (2, 11), a distributing structure (10) is arranged so as to be at least partially fuel-permeable.

6. Assembly of single cells according to claim 2 wherein the electronically conductive material of the shunt conductive structures (2, 11) is selected from metals, alloys, conductive carbon modifications, conductive polymers, and mixtures thereof.

7. Assembly of single cells according to claim 1 wherein the shunt conductive structure (2, 11) is guided up on to the external electrode area, said shunt conductive structure (2, 11) almost completely covering that electrode area.

8. Assembly of single cells according to claim 7 wherein, on the external electrode areas and the shunt conductive structure, a distributing structure (10) is arranged so as to be at least partially fuel-permeable.

9. Assembly of single cells according to claim 7 wherein, between the external electrode areas and the shunt conductive structure (2, 11), a distributing structure (10) is arranged so as to be at least partially fuel-permeable.

10. Assembly of single cells according to claim 7 wherein the electronically conductive material of the shunt conductive structures (2, 11) is selected from metals, alloys, conductive carbon modifications, conductive polymers, and mixtures thereof.

11. Assembly of single cells according to claim 1 wherein, on the external electrode areas and the shunt conductive structure, a distributing structure (10) is arranged so as to be at least partially fuel-permeable.

12. Assembly of single cells according to claim 11 wherein, between the external electrode areas and the shunt conductive structure (2, 11), a distributing structure (10) is arranged so as to be at least partially fuel-permeable.

13. Assembly of single cells according to claim 11 wherein the electronically conductive material of the shunt conductive structures (2, 11) is selected from metals, alloys, conductive carbon modifications, conductive polymers, and mixtures thereof.

14. Assembly of single cells according to claim 1 wherein, between the external electrode areas and the shunt conductive structure (2, 11), a distributing structure (10) is arranged so as to be at least partially fuel-permeable.

15. Assembly of single cells according to claim 14 wherein the electronically conductive material of the shunt conductive structures (2, 11) is selected from metals, alloys, conductive carbon modifications, conductive polymers, and mixtures thereof.

16. Assembly of single cells according to claim 1 wherein the electronically conductive material of the shunt conductive structures (2, 11) is selected from the group consisting of metals, alloys, conductive carbon modifications, conductive polymers, and mixtures thereof.

17. Assembly of single cells according to claim 1 wherein the shunt conductive structures (2, 11), are of a thickness of from 0.1 to 5 mm.

18. Assembly of single cells according to claim 1 wherein the shunt conductive structures (2, 11) are a structure having a non-smooth surface, from the group consisting of nets, tissues, porous structures, and structures having a roughened surface.

19. Assembly of single cells according to claim 1 wherein the distributing structure (10) is an electronically conductive structure.

20. Assembly of single cells according to claim 1 wherein at least 2 and at most 50, one-dimensional diaphragm electrode units are arranged in parallel and connected in series.

21. Assembly of single cells according to claim 1 wherein at least 2 up to a maximum of 50 one-dimensional diaphragm electrode units are arranged in parallel and connected in parallel.

22. An assembly of single cells according to claim 1 wherein the assembly is used in a diaphragm polymer electrode cell.

* * * * *